3,798,304
HYDRO-METALLURGICAL TREATMENT OF NICKEL COBALT AND COPPER CONTAINING MATERIALS

David Weston, 34 Parkwood Ave., Toronto, Ontario, Canada
No Drawing. Continuation-in-part of application Ser. No. 221,437, Jan. 27, 1972, which is a continuation of abandoned application Ser. No. 869,376, Oct. 24, 1969. This application June 8, 1972, Ser. No. 260,991
Claims priority, application Canada, Dec. 13, 1968, 37,790
The portion of the term of the patent subsequent to Feb. 19, 1991, has been disclaimed
Int. Cl. C22b 3/00
U.S. Cl. 423—36                                26 Claims

ABSTRACT OF THE DISCLOSURE

A process for the recovery by leaching of nickel cobalt and copper using sulphuric acid and employing agents capable of introducing alkali metal ion or ammonium ion to the pulp whereby the dissolution of desired metals is controlled and the iron content of the solution is reduced to a desired level. The leaching may be carried out at temperatures and pressures below or above atmospheric pressure and the atmospheric boiling point of the pulp.

---

This application is a continuation-in-part of my prior application Ser. No. 221,437, filed Jan. 27, 1972 which was a continuation of application Ser. No. 869,376, filed Oct. 24, 1969, now abandoned.

THE BACKGROUND OF THE INVENTION

This invention relates to the hydrometallurgical treatment of materials for the recovery of nickel cobalt and copper. Materials susceptible to treatment according to the invention include nickel bearing laterite ores, nickel or copper mineral treated products such as concentrated nickel or copper ores and other ores or smelter and roaster products where nickel, cobalt and copper or any combination of these minerals or products are associated with iron and are susceptible to leaching with sulphuric acid, and material from tailing dumps which contain residual quantities of copper.

Attempts to recover nickel and cobalt from the nickel laterites by hydro-metallurgical process such as leaching have been hindered by the presence in the laterites of a substantial amount of iron mineral such as geothite and hematite together with complex hot rock iron minerals. When subjected to a sulphuric acid leaching, for example, part of the iron readily goes into solution where it has the effect firstly of causing excessive sulphuric acid consumption and secondly of preventing more than a certain proportion of the nickel and cobalt present from going into solution. Once the iron is in solution it is very difficult and costly to separate the nickel and cobalt from the iron. This situation has resulted in commercial exploitation of the nickel laterites being generally confined to the production of ferro-nickel and in the use of pyrometallurgy and other expensive treatment steps in combinations with hydrometallurgy to reduce the iron content to an acceptably low value in the final ferro-nickel product. These processes generally employ complex flow sheets which are expensive to operate and require a high capital cost outlay.

SUMMARY OF THE INVENTION

I have now found that it is possible, by properly controlling conditions and the addition of certain reagents, to conduct a leaching process in which the nickel and cobalt are effectively dissolved while the iron is prevented from remaining in the solution, whereby a pregnant liquor is produced containing a high proportion of the cobalt and nickel present in the original lateritic ore and with a nickel to iron ratio down to as low as 50 nickel to 1 iron, from which pregnant liquor the cobalt and nickel are readily recoverable by known processing methods including, for instance, ion exchange. I have further found that such leaching techniques apply equally well to the recovery of copper and nickel values in a variety of materials from which such values were thought to be economically unrecoverable because of low grade, the presence of sulphuric acid soluble iron, and the supposed insolubility of the mineral values and the like.

According to my invention the laterite nickel ore or other material is comminuted to a suitable degree of fineness for leaching which will generally be from a minus 28 mesh grind to about 90% minus 325 mesh and formed into a pulp of suitable consistency which would normally be as high in solids as can effectively be handled during the comminution stage. Where a dispersing agent is employed during comminution this pulp density may be as high as 50% by wt. solids whereas without a dispersing agent it may be necessary to go as low as 25% by wt. solids. The pulp is then subjected to a first leaching stage with the addition of sufficient sulphuric acid to bring the pH down to a value below about 1.5 and preferably below about 0.7 and the leaching is allowed to proceed at atmospheric pressure and temperatures varying from 70° C. to the boiling point of the pulp, or if desired, and pressure equipment is economically justified at higher temperatures and pressures. This leaching stage is permitted to continue until there is a substantial concentration of iron in the solution. For instance, at a pulp density of 45% by wt. solids my preferred concentration of iron is approximately 25 grams per litre of solution, which point is generally reached, in leaching carried out below the atmospheric boiling point, after a period of approximately 16 hours. It will be appreciated that the laterites vary over a wide range in both their iron and rock content. For instance, the normal variation in the laterites is approximately 10% by wt. iron to a maximum of 45% by wt. iron. The optimum conditions of my leaching process will therefore change, within limits, depending upon the chemical composition of the laterite being treated. When the above condition has been reached, I then add to the pulp a precipitating agent for the iron in stage additions during the remainder of the leach, in quantities sufficient to cause controlled precipitation of the iron from the solution. As precipitating agents I may use any agent capable of introducing alkali metal or ammonium ions to the pulp. My preferred agents are potassium carbonate and sodium carbonate. While potassium carbonate appears to be the most effective, it is relatively high in price compared to sodium carbonate and this in many cases indicates the use of the latter for economic reasons. While the indications are that all alkali metals will produce the precipitation phenomenon, I exclude from consideration rubidium and cesium on obvious economic ground. I may also use sodium chloride, sodium sulphate, potassium nitrate or combinations of these reagents with sodium or potassium carbonate. It is beneficial in some cases to carry out the leach in the presence of an oxidizing agent which may also act as a precipitating agent.

Generally speaking, for a particular process the choice of reprecipitating agent will be governed by economic factors. For instance, where the treating plant is located near the ocean, in certain applications I may use sea water for the formation of my pulp and eliminate or reduce materially the amount of sodium or potassium carbonate. This is particularly true in the treatment of sea nodules containing copper and nickel.

The leach is continued until the desired economic level of solution of metal values has been attained and at this point if the iron content of the solution is not at a usefully low level, further precipitating agent is added to complete the precipitation and bring the iron content of the solution down to the desired level.

While I have indicated that the purpose of my initial stage of leaching is to bring a desired amount of iron into solution and that the addition of the precipitating agent for iron usually follows this first stage, I have found that with the slower acting of the precipitating agents, such as sodium chloride, sodium sulphate and the like, the addition of a certain quantity of these reagents during the comminuting process will not prevent the concentration of iron in solution from reaching the desired level during the first stage and I prefer in many cases to make such additions during the comminution of the ore in order to decrease the amount of relatively more expensive, faster acting precipitating agents which are added at the second and subsequent stages of leaching. Further, small increments of the precipitating agent or agents may be added either to the grinding stage or during the primary leaching stage.

As it is desirable to work at as high pulp density as possible in order to control the sulphuric acid consumption and minimize plant size, I prefer to carry out the comminution with the addition of a dispersing agent or a wetting agent or both. Among the available dispersing agents, I prefer sodium silicate because of its ready availability and relatively low cost. Any wetting agent which is a powerful lowerer of surface tension and has low frothing characteristics is suitable.

The leach described generally above may be modified if desired by the introduction of various gaseous media. For instance, I have found that the introduction of sulphur dioxide accelerates both the iron and cobalt dissolution. Carbon dioxide on the other hand retards iron and cobalt dissolution and accelerates nickel dissolution. The introduction of air accelerates iron dissolution, retards iron deposition and cobalt and nickel dissolution. Thus, while the introduction of gaseous media to the leach is not an essential feature of my process, in certain instances useful additional control of the process may be achieved with possibly some saving in operational costs, due to shortened time or reduction in acid consumption.

If as a precipitating agent a strong oxidizing agent such as potassium dichromate is employed, the rate of deposition of iron is strongly accelerated.

It is important that the rate of deposition of the iron be such that the concentration of iron in the solution does not drop below a certain value until the dissolution of nickel and cobalt has approached its desired end point since it appears that the dissolution rate of nickel and cobalt is adversely affected if the amount of iron in solution falls below about 1 gram per liter. However, the optimum balance between the rate of iron deposition and the dissolution rate for cobalt and nickel will depend upon the composition of the ore being treated and will vary between laterites of different chemical composition. The results which I have achieved on the laboratory scale indicate that by using the process of the present invention recoveries of higher than 80% of the nickel and cobalt may be obtained in the pregnant solution concurrently with the final pregnant solution containing little more than a trace of iron.

My invention also comprehends the carrying out of the process at temperatures above the atmospheric boiling point of the pulp inasmuch as the chemical phenomena associated with dissolution of the desired mineral values follow the same pattern at higher temperatures and pressures and the normal acceleration of the dissolution rate associated with rises in temperature applies. Thus, although the use of high temperatures and pressures involves the use of costly pressure equipment and places physical limitations on the manipulative procedures involved, the resulting shortening of total leaching time to obtain a desired degree of dissolution and the fact that a coarser grind may be tolerated may economically outweigh the disadvantages of having to employ pressure equipment. In cases where the higher temperature and pressures are justified it is an advantageous feature of the invention that the final deposition of iron may be carried out at atmospheric pressure after the desired degree of dissolution of metal values has been achieved at the higher temperatures and pressures.

EXAMPLES OF THE OPERATION OF THE INVENTION

The following examples illustrate the invention. In all of the examples except as otherwise noted the same apparatus was employed which consisted of a laboratory ball mill for comminuting the ores, a constant temperature thermostatically controlled oil bath equipped with approximately 2 liter sealable glass pots equipped with motor driven stirring devices and two pH meters equipped with special electrodes for accurate high temperature low pH readings. Samplings were taken by means of 50 and 25 cc. pipettes at prescribed intervals. The progress of cobalt and nickel dissolution was followed by analyzing the solids for undissolved cobalt and nickel. Iron in solution and the final cobalt and nickel in solution was determined by standard quantitative analysis. All manipulative procedures were standardized throughout.

Example I

A sample of Penarroya, New Caledonia, lateritic nickel ore had the following head analysis:

| | Percent by wt. |
|---|---|
| Ni | 1.38 |
| Co | 0.092 |
| Total Fe | 41.5 |
| MgO | 3.75 |
| $Al_2O_3$ | 4.25 |
| $SiO_2$ | 7.40 |

535 grams of this ore (estimated 515 to 520 grams dry) were ground for 15 minutes in the laboratory ball mill at a pulp density of 30% by wt. solids, with the addition of 10 cc. of 1% solution of a wetting agent (a trimethyl nonyl ether of polyethylene glycol) and 16 grams of sodium silicate. The resulting pulp was transferred to a testing pot on the oil bath at approximately 90° C. and conditioned for 20 hours at which time the addition of 120 cc. of 10% by wt. C.P. sulphuric acid reduced the pH of the pulp to 0.8. The conditioning was continued for 20 hours, a sample was taken for analysis and 15 grams of dry crystalline potassium carbonate was added to the pulp. An additional quantity of 5 grams of potassium carbonate was added every two hours until a total of 30 grams had been added. 20 hours after the first addition of potassium carbonate, a second sample was taken for analysis, 15 grams of potassium carbonate were added and each two hours thereafter an additional 5 grams of potassium carbonate were added until the total addition for this stage had reached 30 grams. 24 hours after the second addition of potassium carbonate was commenced, a sample was taken for analysis and samples were taken at 24 hour intervals thereafter.

The following were the metallurgical results:

| Time, hrs. | Ni, percent by wt. (in solids) | Co, percent by wt. (in solids) | Pregnant solution | | |
|---|---|---|---|---|---|
| | | | Fe, gms./l. | Ni, gms./l. | pH |
| 20 | 1.30 | 0.072 | 28.8 | | 0.8 |
| 40 | 0.63 | 0.036 | 1.54 | | 1.4 |
| 64 | 0.58 | 0.033 | 0.10 | | 2.10 |
| 88[1] | 0.59 | 0.032 | 0.15 | | 2.10 |
| 112 | 0.46 | 0.031 | 0.64 | | 1.80 |
| 136 | 0.43 | 0.030 | 0.28 | 2.28 | 1.90 |

[1] 20 cc. C.P. $H_2SO_4$ were added after sample was taken.

It is to be noted that after 64 hours the iron in solution had fallen to 0.10 gms./l. and that after 88 hours the iron in solution was still only 0.15 gms./l. whereas the nickel and cobalt dissolution showed no improvement for the past 24 hours. The addition of sulphuric acid at this point can be seen to have brought the iron in solution up to 0.64 gms./l. enabling the dissolution of nickel and cobalt to proceed.

Example II

A 835 gram sample of the same ore as that used in Example I was ground for 25 minutes in a laboratory ball mill at a pulp density of approximately 50% by wt. solids in the absence of any reagents following which the resulting pulp was transferred to a testing pot on the oil bath where 200 cc. of C.P. sulphuric acid were added to reduce the pH of the pulp to 0.7. A temperature of approximately 90° C. was maintained and the pulp was conditioned for 20 hours at which time a sample was withdrawn for analysis. Six litres of air per hour were then introduced to the pulp and the conditioning was continued for 20 hours at the end of which time a sample was taken for analysis, following which the air was turned off and 25 grams of dry crystalline sodium sulphate were added to the pulp followed by a further 25 grams 3 hours later. Twenty hours after the first addition of sodium sulphate a sample was taken for analysis and 25 grams of sodium sulphate were added followed four hours later by a further 25 grams. The conditioning was continued for 24 hours when a sample was taken for analysis. After a final conditioning period of another 24 hours, a further sample was taken for analysis. The following were the metallurgical results:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 20 | 1.22 | 0.070 | 49.2 | | 0.7 |
| 40 | 1.07 | 0.065 | 58.3 | | 1.1 |
| 60 | 0.65 | 0.035 | 31.9 | | 0.9 |
| 84 | 0.48 | 0.025 | 9.70 | | 1.2 |
| 108 | 0.37 | 0.025 | 11.3 | | 1.20 |

These results indicate the accelerating effect of the introduction of air upon the solution rate of iron and also indicate that the action of sodium sulphate as a deposition agent is relatively mild compared to that of potassium carbonate as indicated in Example I.

Example III

A further sample of 835 grams of the same ore as that used in Examples I and II was ground for 15 minutes in a laboratory ball mill at a pulp density of approximately 25% by wt. solids in the absence of any reagents following which the resulting pulp was transferred to a testing pot on the oil bath at a temperature of approximately 90° C. and 120 grams of sodium chloride was added following which the pulp was conditioned for 24 hours and a sample was taken for analysis. After a further period of conditioning for 20 hours a second sample aws taken for analysis and 225 cc. of C.P. sulphuric acid was added and conditioning was continued for a further 20 hours and a further sample was taken for analysis. 25 grams dry crystalline potassium carbonate were then added to the pulp and conditioning was continued for 24 hours when a sample was taken for analysis. After a further 24 hours of conditioning, the final sample was taken for analysis. The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 24 | 1.27 | 0.092 | 0.2 | | 5.85 |
| 44 | 1.25 | 0.090 | 0.1 | | 5.90 |
| 64 | 0.72 | 0.054 | 29.6 | | 0.6 |
| 88 | 0.33 | 0.029 | 2.80 | | 1.05 |
| 112 | 0.26 | 0.026 | 1.54 | | 1.2 |

This test illustrates that initial introduction of sodium chloride does not prevent an acceptable rate of iron dissolution when sulphuric acid is added subsequently and it shows furthermore that a relatively smaller amount of potassium carbonate will under these conditions produce a satisfactory deposition of the iron and dissolution of the nickel and cobalt.

Example IV

A 540 gram sample of lateritic nickel ore supplied by the International Nickel Company of Canada, and having a head analysis of 1.42% by wt. nickel, 0.126% by wt. cobalt and 42.2% by wt. iron, was ground in a laboratory ball mill at a pulp density of approximately 30% by wt. solids in the presence of 75 grams of sodium chloride. The resulting pulp was transferred to a testing pot on the oil bath at a temperature of approximately 90° C. and the pulp was conditioned for two hours at which time 150 cc. of C.P. sulphuric acid were added and the pulp was conditioned for a period of 20 hours following which a sample was taken for analysis and the pulp was conditioned for a further 20 hours following which a further sample was taken for analysis. Five grams of potassium carbonate were added to the pulp and the pulp was conditioned for a further 20 hours when a further sample was taken for analysis and 11 grams of potassium carbonate were added to the pulp. After 24 hours of further conditioning a further sample was taken for analysis and 4 grams of potassium carbonate were added to the pulp and the pulp was conditioned for a further 24 hours before a final sample was taken for analysis. The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 20 | 0.71 | 0.047 | 12.4 | | 0.75 |
| 40 | 0.71 | 0.048 | 3.50 | | 0.95 |
| 60 | 0.38 | 0.025 | 0.84 | | 1.35 |
| 84 | 0.34 | 0.023 | 0.37 | 2.90 | 1.40 |
| 108 | 0.30 | 0.021 | 0.21 | 3.10 | 1.40 |

These results indicate that sodium chloride is effective as a deposition agent and when followed with relatively small stage additions of potassium carbonate results in a very effective combination of iron deposition and nickel and cobalt dissolution.

Example V 870 grams of a sample of lateritic ore supplied by the International Nickel Company of Canada and having a head analysis of 1.42% by wt. nickel, 0.126% by wt. cobalt and 42.2% by wt. iron, was ground for 25 minutes in a laboratory ball mill at a pulp density of 45% by wt. solids in the presence of 32 grams of sodium silicate. The pulp was transferred to a testing pot on the oil bath at a temperature of approximately 90° C. and after four hours conditioning, 120 grams of sodium chloride were added and the pulp was further conditioned for 20 hours. 225 cc. of C.P. sulphuric acid was added, conditioning was continued for 20 hours and a sample was taken for analysis. 10 grams of potassium carbonate was added and conditioning was continued for a further 20 hours. A sample was taken for analysis, 8 grams of potassium carbonate were added and the pulp was conditioned for a further 24 hours following which a further sample was taken for analysis and a further 4 grams of potassium carbonate added. Conditioning was continued for 48 hours with samples taken at 24 hour intervals.

The metallurgical results were as follows:

| Time, hrs. | Ni, percent by wt. (in solids) | Co, percent by wt. (in solids) | Pregnant solution | | pH |
|---|---|---|---|---|---|
| | | | Fe, gms./l. | Ni, gms./l. | |
| 20 | 0.66 | 0.046 | 10.2 | | 0.75 |
| 40 | 0.38 | 0.046 | 0.96 | | 1.15 |
| 64 | 0.33 | 0.025 | 0.47 | | 1.40 |
| 88 | 0.30 | 0.025 | 0.37 | 5.85 | 1.60 |
| 112 | 0.27 | 0.022 | 0.26 | 6.05 | 1.65 |

This test shows the effectiveness of the combination of sodium silicate and salt followed by relatively small additions of potassium carbonate in stages.

Example VI

Another 870 gram sample of the same ore used in Example V was ground in a laboratory ball mill for 25 minutes at a pulp density of 45% by wt. solids in the presence of 32 grams of sodium silicate. The pulp was then transferred to a testing pot on the oil bath at a temperature of approximately 90° C. and after four hours conditioning 120 grams of sodium chloride were added and the pulp was further conditioned for a period of 20 hours. 225 cc. of C.P. sulphuric acid were added and the conditioning was continued for 20 hours and a sample was taken for analysis. 10 grams of crystalline sodium sulphate were added and the conditioning was continued for a further 20 hours and a sample was taken for analysis. A second quantity of 10 grams of sodium sulphate were added and the conditioning was continued for 24 hours and a further sample was taken for analysis. A further addition of six grams of sodium sulphate was made, the conditioning was continued a further 24 hours and a sample was taken for analysis.

The metallurgical results were as follows:

| Time, hrs. | Ni (in solids) | Co (in solids) | Pregnant solution | | |
|---|---|---|---|---|---|
| | | | Fe, gms./l. | Ni, gms./l. | pH |
| 20 | 0.62 | 0.043 | 6.58 | | 0.75 |
| 40 | 0.53 | 0.037 | 1.81 | | 1.05 |
| 64 | 0.42 | 0.029 | 2.10 | | 1.20 |
| 88 | 0.40 | 0.027 | 1.20 | 6.87 | 1.35 |

This test shows the effectiveness of sodium sulphate as a deposition agent permitting good dissolution of the cobalt and nickel while bringing the iron in solution down to an acceptable level. Repetitions of the same procedure employing ammonium carbonate in the one case and lithium carbonate in another case indicated that these two compounds act as deposition agents in substantially the same manner as sodium sulphate.

Example VII 540 grams of the same ore as that employed in Examples V and VI were ground for 15 minutes in the laboratory ball mill at 30% by wt. solids following which the pulp was transferred to a testing pot on the oil bath at a temperature of approximately 90° C., 150 cc. of C.P. sulphuric acid were added and the pulp was conditioned for a period of 20 hours following which a sample was taken for analysis. 12.5 grams of potassium nitrate were added, the conditioning was continued for 20 hours and a further sample was taken for analysis. A further quantity of 12.5 grams of potassium nitrate were added to the pulp, conditioning was continued for a further 20 hours and a further sample was taken for analysis. A further 12.5 grams of potassium nitrate were added, the pulp sample was taken for analysis after 24 hours and after continuing with the conditioning for a further 24 hours a final sample was taken for analysis.

| Time, hrs. | Ni, percent by wt. (in solids) | Co, percent by wt. (in solids) | Pregnant solution | | |
|---|---|---|---|---|---|
| | | | Fe, gms./l. | Ni, gms./l. | pH |
| 20 | 1.03 | 0.060 | 42.2 | | 0.85 |
| 40 | 0.87 | 0.046 | 28.1 | | 0.85 |
| 60 | 0.69 | 0.037 | 19.5 | | 1.10 |
| 84 | 0.58 | 0.033 | 9.50 | 2.63 | 1.00 |
| 108 | 0.41 | 0.023 | 3.46 | 2.90 | 1.00 |

This test indicates the ability of potassium nitrate to act as a deposition agent in the process of the invention.

Example VIII

A 835 gram sample of the ore used in Example I was ground for 25 minutes in the laboratory ball mill at a pulp density of approximately 50% by wt. solids and the pulp was transferred to a testing pot on the oil bath at a temperature of approximately 90° C., 200 cc. of C.P. sulphuric acid were added and the pulp was conditioned for 20 hours and a sample was taken for analysis. 25 grams of potassium carbonate were then added followed by a further 25 grams four hours later. 20 hours after the first addition of potassium carbonate, a sample was taken for analysis and the pulp was conditioned a further 20 hours, a sample was taken for analysis and 25 grams of potassium dichromate were added followed four hours later by 25 grams of potassium carbonate. An extra sample was taken for analysis three hours following the addition of the potassium dichromate. Conditioning was continued and a sample was taken for analysis at 24 hour intervals, with 25 cc. of C.P. sulphuric acid added after the last addition of potassium carbonate.

The metallurgical results were as follows:

| Time, hrs. | Ni, percent by wt. (in solids) | Co, percent by wt. (in solids) | Pregnant solution | | |
|---|---|---|---|---|---|
| | | | Fe, gms./l. | Ni, gms./l. | pH |
| 20 | 1.08 | 0.070 | 49.6 | | 0.7 |
| 40 | 0.57 | 0.034 | 2.82 | | 1.45 |
| 60 | 0.51 | 0.033 | 0.92 | | 1.9 |
| 63 | 0.50 | 0.031 | 0.20 | | |
| 88 | 0.47 | 0.032 | 0.21 | | 1.9 |
| 112 | 0.38 | 0.031 | 0.50 | | 1.7 |
| 136 | 0.34 | 0.028 | 0.36 | 4.25 | 1.85 |

The foregoing results illustrate the accelerating effect that potassium dichromate has upon the deposition of iron where the iron in solution fell from 0.92 to 0.20 grams per litre in the first three hours following the first addition of potassium dichromate.

Example IX

An 835 gram sample of nickel ore supplied by International Nickel Company of Canada and having a head analysis of 1.42% by wt. nickel, 0.126% by wt. cobalt, and 42.2% by wt. iron was ground in the laboratory ball mill for 30 minutes at a pulp density of 50% by wt. in the presence of 200 cc. of a 10% solution of sodium silicate, 15 cc. of a 1% solution of wetting agent (a trimethyl nonyl ether of polyethylene glycol) and 20 grams of sodium carbonate. The pulp was then transferred to a testing pot on the oil bath at approximately 90° C. and conditioned for four hours when 165 cc. of C.P. sulphuric acid were added together with 10 grams of sodium carbonate. The pulp was conditioned for 16 hours, a sample was taken for analysis and 5 grams of sodium carbonate were added. Conditioning was continued for 12 hours and a sample was taken for analysis and 50 grams of sodium carbonate were added. Conditioning was continued and samples were taken for analysis every 12 hours. In this example, the iron content of the solids was determined by chemical analysis.

The metallurgical results were as follows:

| Time, hrs. | Ni, percent by wt. (in solids) | Co, percent by wt. (in solids) | Fe, percent by wt. (in solids) | Pregnant solution | |
|---|---|---|---|---|---|
| | | | | Fe, gms./l. | pH |
| 20 | 0.88 | 0.046 | 42.6 | 11.0 | 1.3 |
| 32 | 0.72 | 0.040 | 39.8 | 4.33 | 1.45 |
| 44 | 0.74 | 0.037 | 39.9 | 3.56 | 1.5 |
| 56 | 0.66 | 0.034 | 39.2 | 0.78 | 2.15 |
| 68 | 0.63 | 0.035 | 38.3 | 0.72 | 2.0 |
| 80 | 0.64 | 0.035 | 37.9 | 0.94 | 2.0 |

The above results indicate the action of sodium carbonate as an iron deposition agent and show the course of the leach with a relatively low quantity of sulphuric acid.

While the invention has been illustrated in the foregoing examples as applied to the treatment of nickel bearing laterite ores it is obvious that it applies equally as well to beneficiated nickel bearing laterite ores and other Ni bearing ores or beneficiated ores or smelter or roaster products where the nickel is associated with iron and susceptible to leaching with sulphuric acid (herein referred to as "nickel mineral treated products").

Example X

This example illustrates the effect of using increased amounts of sodium chloride in the initial leach liquor.

Following the same procedure as in the preceding examples with a lateritic nickel ore having a head value of 0.70% nickel and 0.089% cobalt, using a leaching temperature of 95–98° C., periodic samples of the liquor and residue were taken and analyzed to indicate the progress of the leach. The results were as follows:

RESIDUE ANALYSIS

|  | Leach test number | | | | | | |
|---|---|---|---|---|---|---|---|
|  | 14 | 15 | 16 | 17 | 18 | 19 | 20 |
| Lbs. NaCl per ton ore. | 15 | 30 | 45 | 60 | 75 | 90 | 100 |
| After 18 hrs.: | | | | | | | |
| Percent Ni | 0.43 | 0.41 | 0.38 | 0.45 | 0.38 | 0.37 | 0.37 |
| Percent Co | 0.031 | 0.030 | 0.027 | 0.026 | 0.027 | 0.028 | 0.027 |
| After 42 hrs.: | | | | | | | |
| Percent Ni | 0.385 | 0.335 | 0.305 | 0.275 | 0.280 | 0.275 | 0.295 |
| Percent Co | 0.031 | 0.030 | 0.027 | 0.025 | 0.026 | 0.025 | 0.0235 |
| After 66 hrs.: | | | | | | | |
| Percent Ni | 0.338 | 0.32 | 0.26 | 0.24 | 0.212 | 0.212 | 0.21 |
| Percent Co | 0.025 | 0.025 | 0.020 | 0.020 | 0.015 | 0.017 | 0.017 |
| After 90 hrs.: | | | | | | | |
| Percent Ni | 0.29 | 0.28 | 0.24 | 0.20 | 0.20 | 0.19 | 0.19 |
| Percent Co | 0.025 | 0.025 | 0.018 | 0.019 | 0.012 | 0.015 | 0.015 |
| After 114 hrs.: | | | | | | | |
| Percent Ni | 0.26 | 0.24 | 0.21 | 0.18 | 0.17 | 0.16 | 0.15 |
| Percent Co | 0.022 | 0.022 | 0.016 | 0.017 | 0.010 | 0.012 | 0.013 |
| Overall extraction: | | | | | | | |
| Ni [1] | 62.9 | 65.7 | 70.0 | 74.2 | 75.7 | 77.1 | 78.6 |
| Co [1] | 75.3 | 75.3 | 82.0 | 80.9 | 88.8 | 86.5 | 86.5 |

[1] Percentages based on head and residue analysis.

NOTE.—Heads:
Percent Ni=0.70.
Percent Co=0.089.

The quality of the leach liquors produced and the effect of the iron precipitation steps is presented in the following table.

SOLUTION ANALYSES

| Leach test number | 14 | 15 | 16 | 17 | 18 | 19 | 20 |
|---|---|---|---|---|---|---|---|
| After 18 hrs.: | | | | | | | |
| Ni, g.p.l | 1.68 | 1.34 | 1.42 | 1.59 | 1.30 | 1.38 | 1.2 |
| Fe, g.p.l | | | | | | | |
| After 42 hrs.: | | | | | | | |
| Ni, g.p.l | 1.69 | 1.42 | 1.53 | 1.80 | 1.68 | 1.82 | 1.6 |
| Fe, g.p.l | 20.88 | 13.99 | 10.35 | 8.38 | 5.69 | 4.50 | 4.2 |
| After 66 hrs.: | | | | | | | |
| Ni, g.p.l | 1.56 | 1.53 | 1.79 | 2.01 | 1.65 | 1.84 | 1.6 |
| Fe, g.p.l | 17.15 | 9.40 | 7.33 | 5.85 | 3.41 | 2.87 | 2.6 |
| After 90 hrs.: | | | | | | | |
| Ni, g.p.l | 1.76 | 1.49 | 1.67 | 1.93 | 1.65 | 1.57 | 1.7 |
| Fe, g.p.l | 14.14 | 6.70 | 4.60 | 3.80 | 2.60 | 2.21 | 2.4 |
| After 114 hrs.: | | | | | | | |
| Ni, g.p.l | 1.93 | 1.60 | 2.01 | 2.09 | 2.03 | 1.94 | 1.9 |
| Fe, g.p.l | 10.92 | 5.92 | 4.50 | 3.25 | 2.58 | 2.13 | 2.1 |

This table shows the effect of the use of sodium chloride with sulphuric acid at a temperature of about 95° C. wherein with the use of increasing amounts of sodium chloride not only is there an increase in nickel and cobalt in solution, but also the added effect of precipitation of iron that has gone into solution.

Particularly noteworthy in the solution analyses is the apparent differential effect on the iron precipitation which occurs with increasing amounts of sodium chloride.

Example XI

This example shows the effect on pressure leaching using sodium chloride and sulphuric acid at in excess of 100° C. In this case three tests were run at a temperature of 200° C. in a laboratory pressure leaching apparatus wherein the natural pressure developed at this temperature was about 275 p.s.i. Using the same amount of sodium chloride in each test, that is, 50 lbs. per ton, and varying the acid input from 313 lbs. per ton in the first test to 628 lbs. per ton in the second test, and 1027 lbs. per ton in the third test, at the end of 24 hours leaching time under these conditions the percentage of the nickel in solution using 313 lbs. of sulphuric acid per ton of solids was 40%, and the cobalt, 78%.

At 628 lbs. sulphuric acid per ton and at 24 hours leaching time, the nickel in solution was 85% and the cobalt, 92%. In using 1027 lbs. sulphuric acid per ton, at the end of the 24 hour period the nickel in solution was 96%, and the cobalt, 93½%.

In using the pressure leaching instead of atmospheric pressure, I prefer to add additional precipitation salts such as sodium carbonate and potassium carbonate to the pulp and condition at atmospheric pressure at a temperature of from 50° C. to the atmospheric boiling point of the pulp for a minimum period of 8 hours.

Example XII

In this example an old plant copper tailings were used in exactly the same equipment and under the same conditions as in Example X. The head value was 0.33% total copper, and 0.25% copper was shown to be acid soluble in sulphuric acid alone by the standard method of analysis. The following test is the optimized of the series. This optimized test was run under the following conditions:

Pulp temperature _____° C__ 70
Sodium chloride _____lbs. per ton__ 20
Sulphuric acid addition _____do____ 45

At the end of 8 hours leaching time, the final tailings analyzed 0.022% total copper, showing outstanding dissolution in not only the acid soluble copper, but also the original copper content that was not acid soluble in the use of sulphuric acid alone. It was found that the minimum temperature for acceptable dissolution of the copper minerals was 55° C.

Example XIII

The following three series of tests were carried out on the tailings from an old copper plant floation circuit.

Conventional leaching tests gave poor metallurgical results with recoveries in the range of 50–55% of the contained copper values. The chemical analysis of these tailings was 0.33% total copper, and 0.24% acid soluble copper. The sulphide copper is taken as the difference between these two analysis, that is, 0.09% copper. All of the following tests were carried out in the same leach bath type of equipment as previously described.

Series I.—In this series of tests the tailings samples were pre-dispersed with varying amounts of sodium silicate, and then leached with sulphuric acid. The leaching time was three hours, the sulphuric acid addition 42 lbs. per ton, and the temperature 65° C. in all tests.

| Pounds per ton sodium silicate: | Percent of total copper placed in solution |
|---|---|
| 0.0 | 75.6 |
| 1.0 | 79.0 |
| 2.0 | 81.0 |
| 4.0 | 82.6 |
| 6.0 | 80.0 |

The graphed metallurgy showed that the optimum amount of sodium silicate was 3.5 lbs. per ton with 82.8% of the total copper in solution. Thus, in using a dispersion agent prior to the leaching cycle, the amount is reasonably critical and should be controlled within narrow limits for optimum results.

Where the optimum amount of sodium silicate is used as a dispersant in the presence of a sufficient sodium ion the increase in recovery is outstanding, as is indicated in the Series II test which follows. In some applications where sufficient sodium ion is present by virtue of the use of the optimum amount of sodium silicate as a dispersant it may be economically desirable simply to predisperse the material to be treated and then to leach with the addition of acid only.

Series II.—This series of tests combines both the pre-dispersion of the pulp with sodium silicate, and increasing the concentration of sodium iron present by the addition of sodium chloride in various amounts. All of the following tests were carried out using 4.0 lbs. per ton sodium silicate, 52 lbs. per ton $H_2SO_4$, a temperature of 70° C., and a leaching cycle of 6 hours.

The sodium chloride was varied from 4.0 lbs. to 12.0 lbs. per ton.

| Pounds per ton sodium chloride: | Percent of total copper placed in solution |
|---|---|
| 4 | 88.6 |
| 6 | 90.0 |
| 8 | 90.5 |
| 10 | 91.2 |
| 12 | 91.2 |

It will be noted that in using sodium chloride to increase the sodium ion concentration, extraction is improved.

In using sodium chloride in combination with a dispersant as above, the minimum amount for optimum metallurgy has been found to be 6.0 lbs. per ton.

The minimum temperature for acceptable leaching time cycles is 50° C. No upper limit of temperature has been determined. This temperature will be a function of leaching time and at temperatures in excess of about 100° C. will of necessity be in enclosed vessels, and develop various natural pressures, dependent on the ultimate temperature used.

In this series of test the copper in solution varied from 2.0 to 2.2 grams per litre, and the iron from 1.5 to 1.7 grams per litre.

Series III.—In this series of tests varying amounts of sodium chloride alone were used as the sodium ion producing agent. The conditions of all tests were, using 45 lbs. per ton of $H_2SO_4$, temperature of 70° C., and 6 hours leaching time cycle.

| Pounds per ton sodium chloride: | Percent of total copper placed in solution |
|---|---|
| 0.0 | 84.3 |
| 10 | 85.4 |
| 15 | 87.3 |
| 20 | 87.6 |
| 25 | 87.9 |
| 30 | 88.3 |

It will be noted that the break in the recovery curve takes place on the addition of between 10 to 15 lbs. per ton of NaCl. At 30 lbs. of NaCl per ton the tailings analyzed 0.037% total copper and 0.008% acid soluble copper, leaving 0.029% as presumably sulphide copper. As the heads contained 0.09% acid insoluble copper, the dissolution of the sulphide copper can probably be attributed to the combination of the sodium ion and oxidation of these old plant tailings in the tailings dump.

In other applications where valuable sulphide minerals are present, and where pre-oxidation has not taken place, the use of oxidizing agents such as oxygen, potassium dichromate, and potassium perchlorate, either prior to or during the leach may assist the dissolution of the sulphides.

While the invention has been illustrated in Examples 12 and 13 as applicable to old plant copper tailings it is obvious that it applies generally to copper and copper nickel materials and tailings where the copper and nickel are associated with iron and susceptible to leaching with sulphuric acid.

What I claim as my invention is:

1. A process for the hydrometallurgical treatment of nickel, cobalt and copper minerals from materials containing at least one sulphuric acid soluble mineral from the group consisting of nickel, cobalt and copper minerals and at least one sulphuric acid soluble iron mineral, comprising: subjecting a prepared pulp of such materials to sulphuric acid leaching in the temperature range of from about 70° C. to about 200° C. by reducing the pH of the pulp to below about 1.5 by the addition of sulphuric acid; having present in the pulp during said leaching a sufficient quantity of an iron precipitating agent selected from the group consisting of agents capable of introducing the ions of ammonium, sodium, potassium, lithium, and combinations thereof and for a sufficient period of time to cause substantial precipitation of dissolved iron contained in solution while permitting dissolution of at least one of the said nickel, cobalt or copper minerals to proceed; whereby to produce a leach solution enriched in values selected from the group consisting of nickel, cobalt and copper values, and low in iron content.

2. A process as claimed in claim 1 wherein said pulp is prepared by comminuting said ore in the presence of dispersion and/or wetting agents.

3. A process as claimed in claim 1 wherein said pulp is prepared by comminuting said ore in the presence of sodium chloride.

4. A process as claimed in claim 1 wherein at least part of the make up liquid for said pulp is sea water.

5. A process as defined in claim 1 wherein the relative rates of precipitation of iron and dissolution of cobalt and nickel are controlled during said leaching process by the introduction to the pulp of gaseous media selected from the group consisting of carbon dioxide, sulphur dioxide and air.

6. A process as defined in claim 1 wherein at least part of the process is carried out in the presence of an oxidizing agent.

7. A process as claimed in claim 1 wherein at least a portion of the process is carried out under pressure at temperatures higher than the atmospheric boiling point of the pulp.

8. A process as claimed in claim 7 wherein subsequent to the carrying out of said portion of the process under pressure, the pulp is conditioned at a temperature below the atmospheric boiling point of the pulp in the presence of said iron precipitating agent until a substantial quantity of dissolved iron in solution has precipitated.

9. A process as defined in claim 8 wherein additional iron precipitating agent is added to the pulp before or as it is being subsequently conditioned.

10. A process for the leaching of copper from materials containing at least one sulphuric acid soluble copper mineral in the presence of sulphuric acid soluble iron comprising: preparing a pulp of the material to be treated, adding sulphuric acid to said pulp to bring the pH down to a value below about 1.5 together with sufficient sodium chloride to act as a precipitating agent for dissolved iron and conditioning the resulting pulp at a temperature of about 50° C. to about 200° C.

11. A process as defined in claim 10 wherein there is also added to the pulp sufficient oxidizing agent to initiate the solution of copper sulphide minerals present in said material.

12. A process for the leaching of copper from materials containing at least one sulphuric acid soluble copper mineral in the presence of sulphuric acid soluble iron comprising: preparing a pulp of the material to be treated, adding sulphuric acid to said pulp to bring the pH down to a value below about 1.5, and subjecting the resulting pulp to conditioning at a temperature of about 50° C. to about 200° C. with the addition before or during said conditioning of at least 6 pounds of sodium chloride per ton of solid material being treated.

13. A process as defined in claim 12 wherein said suitable pulp is prepared with the addition of a dispersing agent.

14. A process as defined in claim 13 wherein the dispersing agent is sodium silicate.

15. A process for the leaching of nickel and copper from materials containing nickel and copper minerals in the presence of sulphuric acid soluble iron mineral comprising: preparing a pulp of the material to be treated, adding sulphuric acid to said pulp to bring the pH down to a value below about 1.5 together with sufficient sodium chloride to act as a precipitating agent for the sulphuric acid soluble iron present and conditioning the resulting pulp at a temperature of about 50° C. to about 200° C.

16. A process as defined in claim 15 wherein there is also added to the pulp sufficient oxidizing agent to initiate the dissolution of copper and nickel sulphide minerals present in said material.

17. A process for the hydrometallurgical treatment of at least one sulphuric acid soluble mineral in the group consisting of nickel, cobalt and copper minerals and contained in the group of materials consisting of lateritic nickel and cobalt bearing ores, sea nodule deposits, copper beating ores and copper flotation plant tailings, and wherein the said materials contain at least one sulphuric acid soluble iron mineral comprising: subjecting a prepared pulp of such materials to sulphur acid leaching in the temperature range of from about 70° C. to about 200° C. by reducing the pH of the pulp to below about 1.5 by the addition of sulphuric acid, having present in the pulp during said leaching a sufficient quantity of an iron precipitating agent selected from the group consisting of agents capable of introducing the ions of ammonium, sodium, potassium, lithium, and combinations thereof and for a sufficient period of time to cause substantial precipitation of dissolved iron contained in solution while permitting dissolution of at least one of the said nickel, cobalt or copper minerals to proceed; whereby to produce a leach solution enriched in values selected from the group consisting of nickel, cobalt and copper values, and low in iron content.

18. A process for the hydrometallurgical treatment of nickel and cobalt minerals from lateritic nickel and cobalt bearing ores containing at least one sulphuric acid soluble iron mineral comprising: subjecting a prepared pulp of the ore to sulphuric acid leaching in the temperature range of from about 70° C. to about 200° C. by reducing the pH of the pulp to below about 1.5 by the addition of sulphuric acid; having present in the pulp during said leaching a sufficient quantity of an iron precipitating agent selected from the group consisting of agents capable of introducing the ions of ammonium, sodium, potassium, lithium, and combinations thereof, and for a sufficient period of time to cause substantial precipitation of dissolved iron contained in solution while permitting dissoluton of the said nickel and cobalt minerals to proceed; whereby to produce a leach solution enriched in nickel and cobalt values, and low in iron content.

19. The process of claim 18 wherein at least part of said iron precipitating agent is added to the pulp prior to the addition thereto of sulphuric acid.

20. The process of claim 18 wherein at least part of said iron precipitating agent is added to the pulp concurrent with the addition thereto of sulphuric acid.

21. The process of claim 18 wherein at least part of said iron precipitating agent is added to the pulp subsequent to the addition thereto of sulphuric acid.

22. The process of claim 18 wherein the said iron precipitating agent is stage added to control the amount of dissolved iron in the solution.

23. The process of claim 18 wherein the relative rates of precipitation of dissolved iron and dissolution of cobalt and nickel are controlled during said conditioning by the introduction to the pulp of gaseous media selected from the group consisting of carbon dioxide, sulphur dioxide and air.

24. The process of claim 18 wherein at least part of the process is carried out in the presence of an oxidizing agent.

25. The process of claim 18 wherein at least part of the leaching process is carried out under pressure at a temperature above the atmospheric boiling point of the pulp.

26. The process of claim 25 wherein following a part of the process carried out under pressure at a temperature above the atmospheric boiling point of the pulp the temperature of the pulp is reduced below the atmospheric boiling point of the pulp and the leaching process is continued with the presence in the pulp of sufficient quantity of agent selected from the group of agents capable of introducing the ions of ammonium, sodium, potassium, lithium and combinations thereof, to produce substantial precipitation of dissolved iron contained in solution; whereby to produce a leach solution enriched in nickel and cobalt values, and low in iron content.

References Cited

UNITED STATES PATENTS

| | | | |
|---|---|---|---|
| 2,831,751 | 4/1958 | Birner | 423—140 |
| 3,434,947 | 3/1969 | Staintveit | 423—140 X |
| 2,754,174 | 7/1956 | Roberts | 423—140 X |
| 3,130,043 | 4/1964 | Lichty | 423—140 X |
| 1,193,734 | 8/1916 | Sulman et al. | 75—115 X |
| 2,719,082 | 9/1955 | Sproule et al. | 75—119 X |
| 913,708 | 3/1909 | Dow et al. | 423—140 X |
| 3,637,371 | 1/1972 | Mackin et al. | 75—101 R |
| 3,367,740 | 2/1968 | Zubryckyj et al. | 423—150 |
| 3,466,144 | 9/1969 | Kay | 423—150 X |

HERBERT T. CARTER, Primary Examiner

U.S. Cl. X.R.

423—41, 140, 143, 146, 150, 34; 75—115, 108, 117, 119